Figure 1:
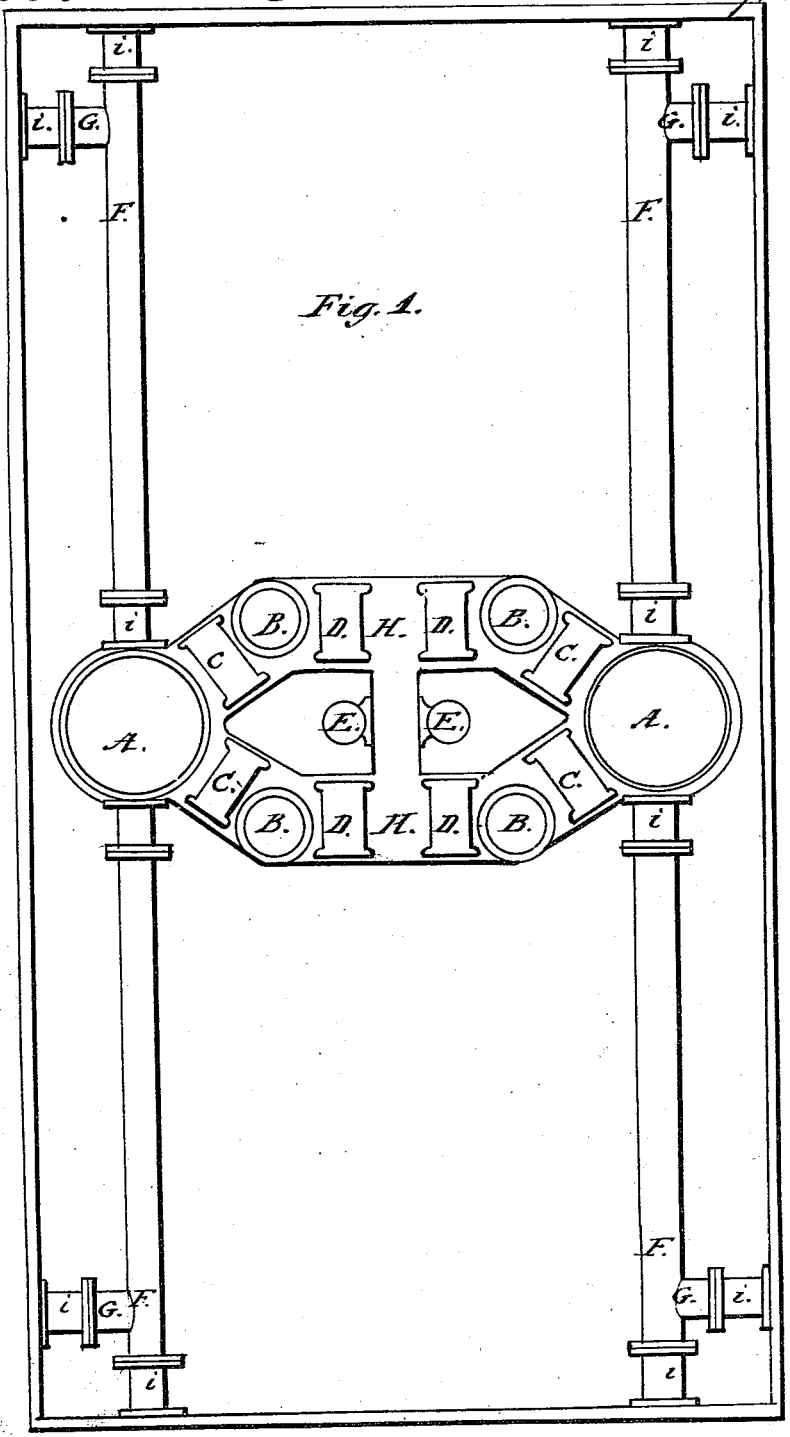

Sheet 2, 2 Sheets.

R. Schuyler.
Hydraulic Propeller.
N° 3,003.    Patented Mar. 17, 1843.

UNITED STATES PATENT OFFICE.

ROBERT SCHUYLER, OF NEW YORK, N. Y.

IMPROVEMENT IN THE METHOD OF PROPELLING VESSELS BY MEANS OF CONTINUOUS STREAMS OF WATER.

Specification forming part of Letters Patent No. 3,003, dated March 17, 1843.

*To all whom it may concern:*

Be it known that I, ROBERT SCHUYLER, of the city of New York, in the State of New York, have invented a new and Improved Mode of Propelling and of Otherwise Maneuvering or Tacking Vessels so as to Govern their Motions in and through the Water; and I do hereby declare that the following is a full and exact description thereof.

My improved mode of propelling and of otherwise producing motions in a vessel consists in the combination of parts which I employ for the purpose of forcing a uniform stream or column of water through an opening or openings below the water-line in the stern, in the bows, and in any part or parts of the sides of such vessel, so that it may be propelled forward, backed, and tacked, or made to turn round at pleasure.

For the purpose of rendering the effluent stream or streams of water uniform, I construct a strong reservoir or strong reservoirs of sufficient capacity to contain a supply of water, and also to contain air, which is to become condensed in said reservoir or reservoirs by the forcing of water into them by force-pumps in the same manner in which the condensation of air is ordinarily effected in the air-vessels of hydraulic machinery.

In the plans hitherto essayed for the propelling of vessels by the efflux of water this fluid has been forced out by the action of the piston of a force-pump, or in some analogous mode, without the continuous and uniform elastic action of condensed air, and the result has been that the effluent water by which it was intended to propel the vessel has been ejected in a pulsatory manner, by which a large portion of the motive power employed has been rendered ineffective; but by combining the air-vessel with the other apparatus for propelling it is manifest that a continuous and uniform action may be kept up. In effecting this object I do not propose to employ any new kind of machinery, but only to combine together and so to arrange apparatus of the kinds well known as to apply the same to a new and useful purpose.

The force-pumps employed by me to fill my reservoirs are to be of the ordinary kind, and must be of sufficient capacity to supply the reservoirs, and they are to be worked by steam or any other adequate power. They may derive their supply of water directly through the bottom of the vessel or from openings in the bows, so as to aid in the forward motion of the vessel, as has been done in former attempts to propel vessels upon analogous principles.

To counteract the effect of the absorption of air by water under a high pressure, I intend to affix condensing-pumps to my air-vessels, which condensing-pumps may be worked as occasion may require and the requisite supply of air be thereby kept up. I intend sometimes to prevent this absorption of air by forming the interior of the air-vessel in part cylindrical and placing in it a piston duly packed, so as to render it air-tight, and leaving it free to work up and down within said cylinder, the water being in contact with its lower and the air with its upper side.

The modes in which the respective parts of the apparatus may be varied are too numerous for definition and need not be the same in any two vessels; but to fulfill the requirements of the law relating to patents I have in the accompanying drawings represented an arrangement of the respective parts which will serve fully to exemplify the principle of its action.

Figure 2:
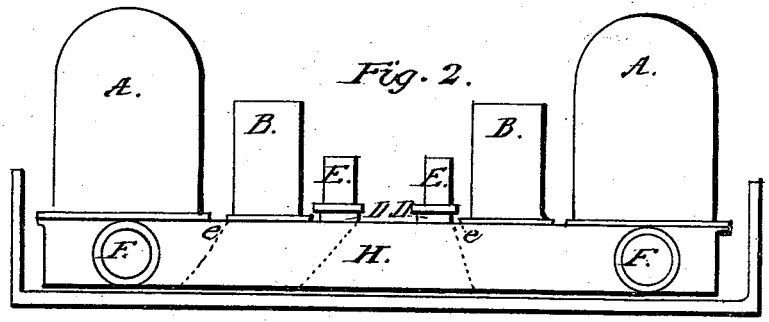

Figure 1 is a plan or top view, and Fig. 2 an elevation of the apparatus.

A A are two reservoirs, of such height, dimensions, and strength as may be necessary for the vessel in which they are to be used.

B B are force-pumps to be worked by the steam-engine in the ordinary manner.

In the channel-way H H between the force-pumps and the reservoirs there must be delivery-valves, as at C C, allowing the water to pass into the receivers, but preventing its return.

D D represent the supply-valves, placed in the channel-way between the supply-pipes E E and the force-pumps.

F F are conduit-pipes extending fore and aft from the reservoirs, and through these the effluent water is to pass. They are of course to be furnished with cocks or valves, by which the quantity and direction of the water may be governed.

G G are lateral conduit-pipes leading to the sides of the vessel toward the stem and stern, and it will be manifest that by the aid of these the vessel may be made to turn as on a pivot, one of them being opened toward the stem and another toward the stern on opposite sides, or one of them only may be opened at pleasure. They are, like the pipes F F, to be furnished with valves which should be situated near their openings or mouths, as at $v$ $v$. There may be valves also at $v'$ $v'$, where the conduit-pipes F F connect with the reservoirs.

Having thus fully described the nature of my invention and shown the manner in which the same may be carried into operation, what I claim therein as new, and desire to secure by Letters Patent, is—

The propelling or otherwise moving a vessel in the water by means of an effluent stream or effluent streams of water forced out by the agency of condensed air through suitable conduits below the water-line of such vessel in a continuous and uniform current, the same being effected by an arrangement of machinery substantially the same in its operation with that herein described and represented.

ROBERT SCHUYLER.

Witnesses:
GEORGE L. SCHUYLER,
S. ALOFSEN.